(12) United States Patent
Mehrgan

(10) Patent No.: US 11,691,713 B2
(45) Date of Patent: Jul. 4, 2023

(54) VTOL HAVING RETRACTABLE WINGS

(71) Applicant: Behrang Mehrgan, West Vancouver (CA)

(72) Inventor: Behrang Mehrgan, West Vancouver (CA)

( * ) Notice: Subject to any disclaimer, the term of this patent is extended or adjusted under 35 U.S.C. 154(b) by 80 days.

(21) Appl. No.: 16/355,787

(22) Filed: Mar. 17, 2019

(65) Prior Publication Data

US 2022/0135204 A1 May 5, 2022

(51) Int. Cl.
*B64C 3/56* (2006.01)
*B64C 3/32* (2006.01)
*B64C 29/00* (2006.01)

(52) U.S. Cl.
CPC ............... *B64C 3/56* (2013.01); *B64C 3/32* (2013.01); *B64C 29/0033* (2013.01)

(58) Field of Classification Search
CPC .......... B64C 3/56; B64C 3/32; B64C 29/0033
See application file for complete search history.

(56) References Cited

U.S. PATENT DOCUMENTS

| 1,556,414 | A | * | 10/1925 | Bumpus | B64C 3/56 244/49 |
| 3,259,343 | A | * | 7/1966 | Roppel | B64C 29/0075 244/12.4 |
| 4,641,800 | A | * | 2/1987 | Rutan | B64C 9/12 244/45 R |
| 8,733,690 | B2 | * | 5/2014 | Bevirt | B64C 29/0033 244/17.23 |
| 2011/0042507 | A1 | * | 2/2011 | Seiford, Sr. | B64C 37/00 244/2 |
| 2011/0127384 | A1 | * | 6/2011 | Afanasyev | B64C 3/56 244/218 |
| 2016/0311522 | A1 | * | 10/2016 | Wiegand | B64D 27/02 |
| 2017/0183093 | A1 | * | 6/2017 | Bialek | B64C 37/00 |
| 2018/0312251 | A1 | * | 11/2018 | Petrov | B64D 27/12 |

* cited by examiner

*Primary Examiner* — Tye William Abell

(57) ABSTRACT

The present invention discloses a VTOL aircraft with retractable wings and TEMCS (trailing edge mounted control surface) mounted tilt-able engines. The aircraft has two hover modes; a first hover mode with retracted wings which allows takeoff and landing in tight landing spots, and a second hover mode with extended wings, during these hover modes, the aircraft operates as a multi-rotor aircraft with additional means of vectored forces created by tilt-able engines, with engines directed upward, and a cruise mode with the wings extended and the engines directed in forward direction.

17 Claims, 10 Drawing Sheets

VTOL HAVING RETRACTABLE WINGS

REFERENCES CITED

| U.S. Pat. No. 1,556,414 | Oct. 6, 1925 | Ernest F. A. Bumpus |
|---|---|---|
| U.S. Pat. No. 1,793,056 | Feb. 17, 1931 | Ernest E. B. Carns |
| U.S. Pat. No. 2,674,422 | May 8, 1950 | Ernest L. Pellarini |
| U.S. Pat. No. 2,868,476 | Jan. 13, 1959 | Ernest W Schlieben |
| U.S. Pat. No. 3,002,712 | Oct. 3, 1961 | Beckwith Sterling |
| U.S. Pat. No. 3,035,789 | May 22, 1962 | Arthur M Young |
| U.S. Pat. No. 3,081,964 | Mar. 19, 1963 | Henry H W Quenzler |
| U.S. Pat. No. 3,082,977 | Mar. 26, 1963 | Arlin Max |
| U.S. Pat. No. 3,181,810 | May 4, 1965 | Norman C |
| U.S. Pat. No. 3,231,221 | Jan. 25, 1966 | Haviland H |
| U.S. Pat. No. 3,259,343 | Jul. 5, 1966 | C. L. Roppel |
| U.S. Pat. No. 3,360,217 | Dec. 26, 1967 | J. C. Trotter |
| U.S. Pat. No. 4,387,866 | Jun. 14, 1983 | Karl Eickmann |
| U.S. Pat. No. 4,784,351 | Nov. 15, 1988 | Karl Eickmann |
| U.S. Pat. No. 5,645,250A | Jul. 8, 1997 | David E. Gevers |
| U.S. Pat. No. 5,758,844 | Jun. 2, 1998 | Darold B. Cummings |
| U.S. Pat. No. 8,733,690B2 | May 27, 2014 | Joeben Bevirt |
| U.S. Pat. No. 9,975,631B1 | May 22, 2018 | Campbell |
| US2016/0311522A1 | Oct. 27, 2016 | Lilium GmbH |

BACKGROUND OF THE INVENTION

1. Field of Invention

The present invention introduces a VTOL with a retractable wing set-up, having a retracted wings "takeoff and landing hover mode", an "extended wings hover mode" and an extended wings "Cruise mode".

2. Description of the Related Art

U.S. Pat. No. 1,556,414 dated Oct. 6, 1925 by Ernest F. A. Bumpus discloses airplane with foldable wings. U.S. Pat. No. 1,793,056 dated Feb. 17, 1931 by Ernest E. B. Carns discloses folding wings.

U.S. Pat. No. 2,674,422 dated May 8, 1950 by Ernest L. Pellarini discloses folding wing for road-able aircraft.

Nearly all the airplanes designed for shipboard duty since late 30s have been equipped with folding wings. Different folding methods, mechanisms and solutions have been in production for decades and several patents have been granted. Thus since this invention is focused on a solution for VTOL application, every common mechanical hinge for wings, and different common actuation methods and harness passage solutions for wings may be employed and this invention is not limited by these details.

U.S. Pat. No. 2,868,476A dated Jan. 13, 1959 by Ernest W Schlieben discloses a tilting cylindrical wing configuration.

U.S. Pat. No. 3,002,712 dated Oct. 3, 1961 by Beckwith Sterling discloses polycopter (Multirotor aircraft).

U.S. Pat. No. 3,035,789 dated May 22, 1962 by Arthur M Young discloses tilting wing configuration.

U.S. Pat. No. 3,081,964 dated Mar. 19, 1963 by Henry H W Quenzler discloses a multiple tilting proprotor aircraft solution.

U.S. Pat. No. 3,082,977 dated Mar. 26, 1963 by Arlin Max Melvin discloses an aircraft with multiple vertical ducted fan rotors.

U.S. Pat. No. 3,181,810 dated May 4, 1965 by Norman C Olson discloses an aircraft with multiple tilting proprotors, and U.S. Pat. No. 3,231,221 dated Jan. 25, 1966 by Haviland H Platt discloses an aircraft with twin tilting proprotors.

Patents, U.S. Pat. No. 3,259,343 dated Jul. 5, 1966 by C. L. Roppel, U.S. Pat. No. 3,360,217 dated Dec. 26, 1967 by J. C. Trotter, U.S. Pat. No. 4,387,866 dated Jun. 14, 1983 by Karl Eickmann, U.S. Pat. No. 4,784,351 dated Nov. 15, 1988 by Karl Eickmann, U.S. Pat. No. 5,645,250A dated Jul. 8, 1997 by David E. Gevers, U.S. Pat. No. 5,758,844 dated Jun. 2, 1998 by Darold B. Cummings, U.S. Pat. No. 9,975,631B1 dated May 22, 2018 by Campbell McLaren, all disclose tilting wing solutions.

U.S. Pat. No. 8,733,690 B2 dated May 27, 2014 by Joeben Bevirt, provides various embodiments for tilting wings and differential thrust control methods.

Patent No. US2016/0311522A1 dated Oct. 27, 2016 by Lilium GmbH discloses multiple duct fans mounted on the flaps of a wing in order to create vectored thrust.

The present invention seems similar to the Lilium aircraft when the wings are extended. However, it adds a "takeoff and landing hover mode" with retracted wings, during which the aircraft can land and take-off in and from tight spots, while the Lilium invention needs special and large open area landing pads. The smaller footprint of the present invention allows landing and takeoff in and from standard parking spots for personal use, and makes the present invention suitable to be used on battleships for military applications. The retracted wings provide better all-round distribution of the engines around the center of gravity which leads to better control in hover mode. Furthermore, the Lilium solution provides vectored lift forces only in longitudinal direction and for transversal control, the only available means is changing the speed of the engines, which is not very efficient specially since the distribution and number of the engines in the front and rear are different. In contrary, the present invention provides vectored forces of the engines for both longitudinal and transversal directions which guarantees the most accurate and responsive control in both directions. The retraction and extension of the wings may be performed seamlessly in the air before landing or after takeoff during a wing transition phase, in which the wing retraction and extension is performed in the air while the aircraft is controlled similar to a multi-rotor aircraft and by vectored forces of the engines.

BRIEF SUMMARY OF THE INVENTION

The present invention discloses a VTOL aircraft with retractable wings. The aircraft may have two hover modes; A first hover mode with retracted wings which allows takeoff and landing in tight landing spots and better hover controllability, and a second hover mode with extended wings, during the hover modes the aircraft operates as a multi-rotor aircraft with tilt-able engines directed upward and creating vertical thrust/lift with additional means of vectored forces both in longitudinal and transversal directions created by tilt-able engines. The aircraft may have a "cruise mode" when the wings are extended with the engines directed in forward direction of the flight.

The aircraft comprises engines, preferably in the form of ducted fans connected to the Trailing Edge Mounted Control Surfaces of the lift bodies those will be called TEMCS hereafter for simplicity (e.g.: aileron, flap, elevator), thus the TEMCSs are tilted together with the connected engines in order to create vectored thrust forces. The engines angle can be adjusted to position engines axis virtually vertical, in order to create vertical thrust/lift for hover modes. While a vertical engine creates only vertical forces, if its axis is deviated from vertical position by changing the angle of a TEMCS, it also creates a horizontal component of thrust. In case of extended wings, by tilting a virtually vertical engine forward or rearward, vectored forces created by said engine create control forces in longitudinal direction of the aircraft. In case of retracted wings, the same means creates control forces in transversal direction of the aircraft.

The aircraft may take-off from the ground with retracted wings and virtually upward directed engines, reach a safe distance from the ground, extend the wings, and start moving forward similar to a multi-rotor, or by angling the engines forward, and continue to tilt the engines forward as it speeds up.

In addition to one or more of the features described above or below, or as an alternative, further embodiments could include wherein at least one position on a wing being engaged with a mechanical support in at least one of retracted and extended positions for better stability.

In addition to one or more of the features described above or below, or as an alternative, further embodiments could include wherein a retracted wing and its tilted TEMCS may be used as a stairway for the pilot in order to climb to the cockpit.

In addition to one or more of the features described above or below, or as an alternative, further embodiments could include wherein the aircraft has wheels for emergency landing during "cruise mode" with breakable covers those may duplicate as hover mode landing gear, and said covers break upon touching the ground in case of emergency landing in "cruise mode", allowing wheels to revolve freely on the ground.

In addition to one or more of the features described above or below, or as an alternative, further embodiments could include wherein alighting elements are connected to trailing side of the tilt-able engines/TEMCSs thus being tilted downward in virtually vertical position during take-off and landing as the engines are tilted upward.

DETAILED DESCRIPTION OF THE INVENTION

Figure 1:
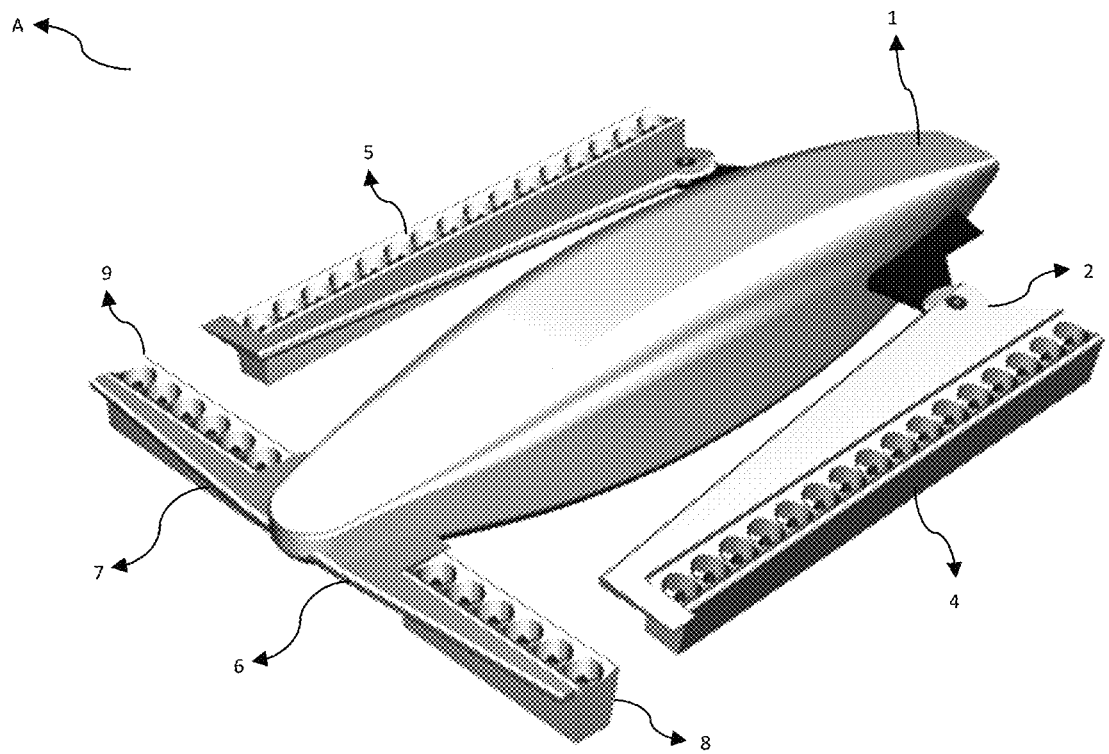
FIG. 1, shows a perspective view of embodiment A of the aircraft in "Take-off and landing hover mode" with retracted wings and upward directed engines.

A detailed description of the embodiments of the disclosed invention and methods is presented herein by way of exemplification and not limitation with reference to the Figures.

A VTOL aircraft includes several elements that are found in all the embodiments. A further or repeated description of those elements will be omitted from the following descriptions. It is to be understood that these elements may include but are not limited to, the electric motor, the batteries, the power generation unit (i.e., the internal combustion engine, the gas turbine engine, the electrical motor-generator or the hybrid engine), the flight control computer, the alighting elements.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiments may include only some of the described exemplary aspects. Accordingly, the disclosure is not to be seen as limited by the foregoing description, but is only limited by the scope of the appended claims.

The terminology used herein is for the purpose of describing particular embodiments only. It is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements and/or components, but do not preclude the presence or addition of one or more other features, integers, steps, operations, element components and/or groups thereof.

FIG. 1 to FIG. 9 display embodiment A of the present invention in different operation modes, having a fuselage 1 which may have a body lift design, a left retractable wing 2, a right retractable wing 3, a left wing TEMCS 4 incorporating plurality of duct fan type engines 14, a right wing TEMCS 5 incorporating plurality of duct fan type engines 14, plurality of tilt-able duct fan type engines in the front of the aircraft at the left side 8 and at the right side 9, a left front airfoil shaped body 6 and a left front airfoil shaped body 7 a left Hinge support structure 10, a right hinge support structure 11, a left revolute joint 12, and a right revolute joint 13. Alternatively, the front airfoil shaped bodies 6 and 7 may be omitted and the front engine assemblies 8 and 9 may be supported by a supporting structure.

Figure 4:
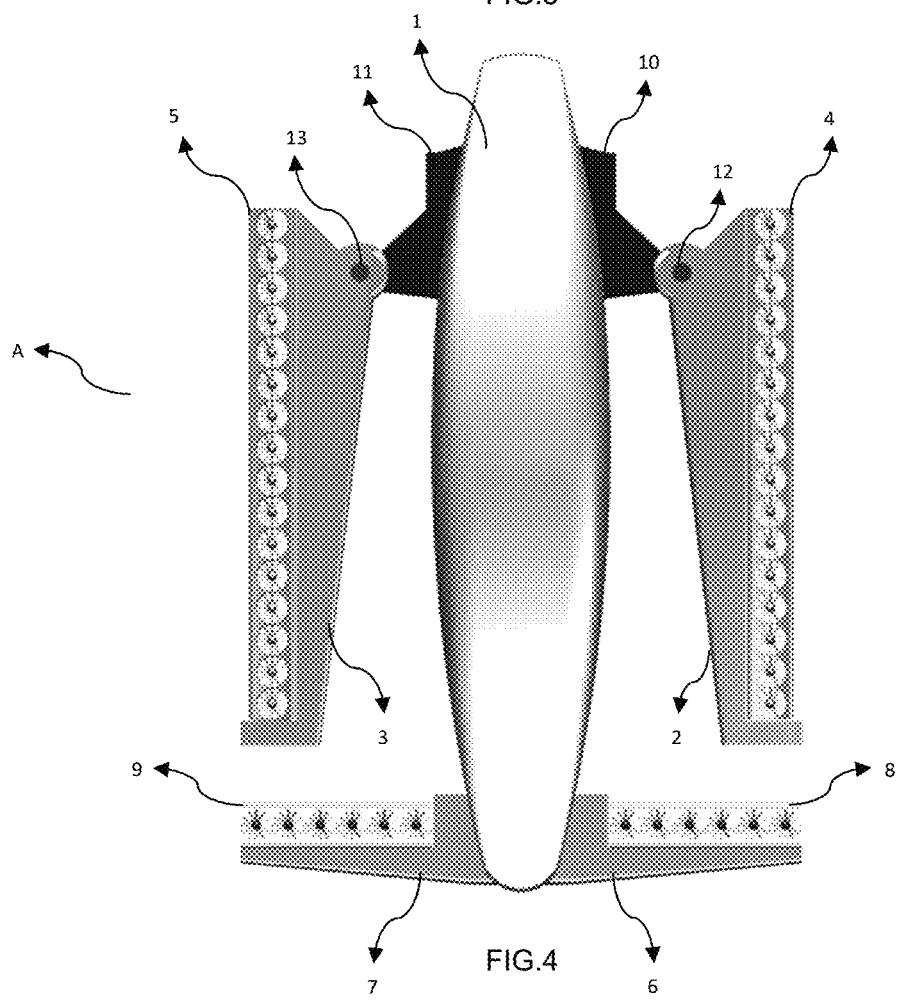
FIG. 4, shows a top view of the embodiment A of the aircraft in "Take-off and landing hover mode" with retracted wings and upward directed engines for take-off and landing in small landing spots.

FIG. 1 is a perspective view of embodiment A of the present invention in "take-off and landing hover mode". FIG. 4 shows a top view of the same embodiment in the same flight mode. During this mode, the wings 2 and 3 are retracted to allow smaller footprint and enable the aircraft to take-off and land in tight spots. It may theoretically allow the aircraft to land in a standard parking spot, or two adjacent parking spots. The displayed engine supporting TEMCS assemblies 4, 5, 8, 9 stay in vertical position during this mode and drive the aircraft as a multi-rotor aircraft with additional means of vectored forces.

Multi-rotor aircraft control methods are common knowledge and are not limiting the present invention. Similar to common multi-rotor systems, thrust/lift of each engine may be adjusted by speed of said engine, or by adjusting the pitch of the blades. Applying equal torque on pairs of counter rotating engines neutralizes the engine induced yaw moment. Yaw moment may be induced by mismatching the balance in aerodynamic torques. Alternatively, yaw moment may be created by vectored force resulted by at least one tilting engine which the plane defining the locus of its tilting axis does not pass through the center of gravity of the aircraft.

Flight direction control is where the present invention is superior to conventional multi-rotor aircrafts. Flight direction control can not only be performed by rolling the whole aircraft toward desired direction similar to conventional multi-rotor aircrafts, but also by the means of vectored forces created by tilt-able TEMCS assemblies 4, 5, 8, 9. During the "takeoff and landing hover mode", tilting each of the TEMCS assemblies 4, 5, 8, 9, and deviation of the axis of the engines from vertical position, creates a horizontal component of thrust in the tilt direction. The horizontal component of thrust created by TEMCS assemblies 4 and 5 causes transversal control forces, and the horizontal component of thrust created by TEMCS assemblies 8 and 9 creates control forces in longitudinal direction of the aircraft.

When takeoff is completed and the aircraft reaches a safe distance from the ground, wing transition may be performed by extending the wings. A reverse transition may be performed to retract the wings before landing. The left and right wings actuation systems are preferred to be mechanically linked to guarantee symmetric extension and retraction of the wings during transition phases.

During the wing transition phases, aircraft hover control is performed as a multi-rotor aircraft by the means of controlling the speed of each engine independently and also by the means of vectored forces created by the angle of the engines. Depending on the weight distribution and control requirements, the front engines may be stopped during the takeoff and landing and may revolve during the "Wing Transition" phases as the weight distribution changes.

Figure 2:
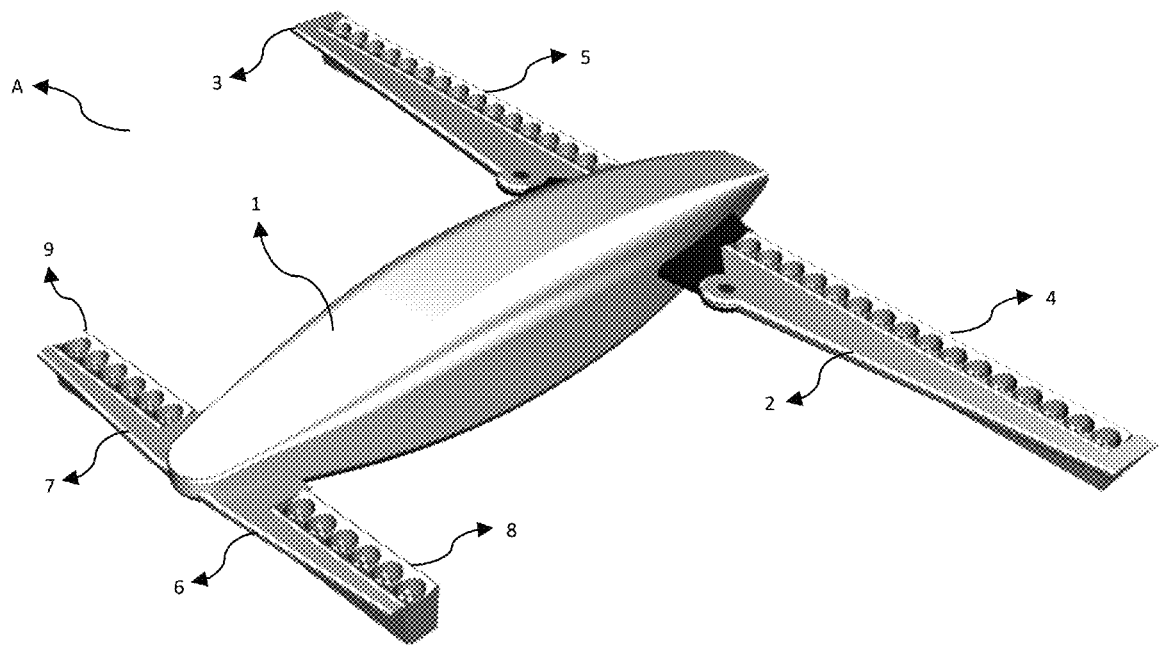
FIG. 2, shows a perspective view of embodiment A of the aircraft in "Extended wings hover mode" with extended wings and upward directed engines for hover before and after cruise mode.
Figure 5:
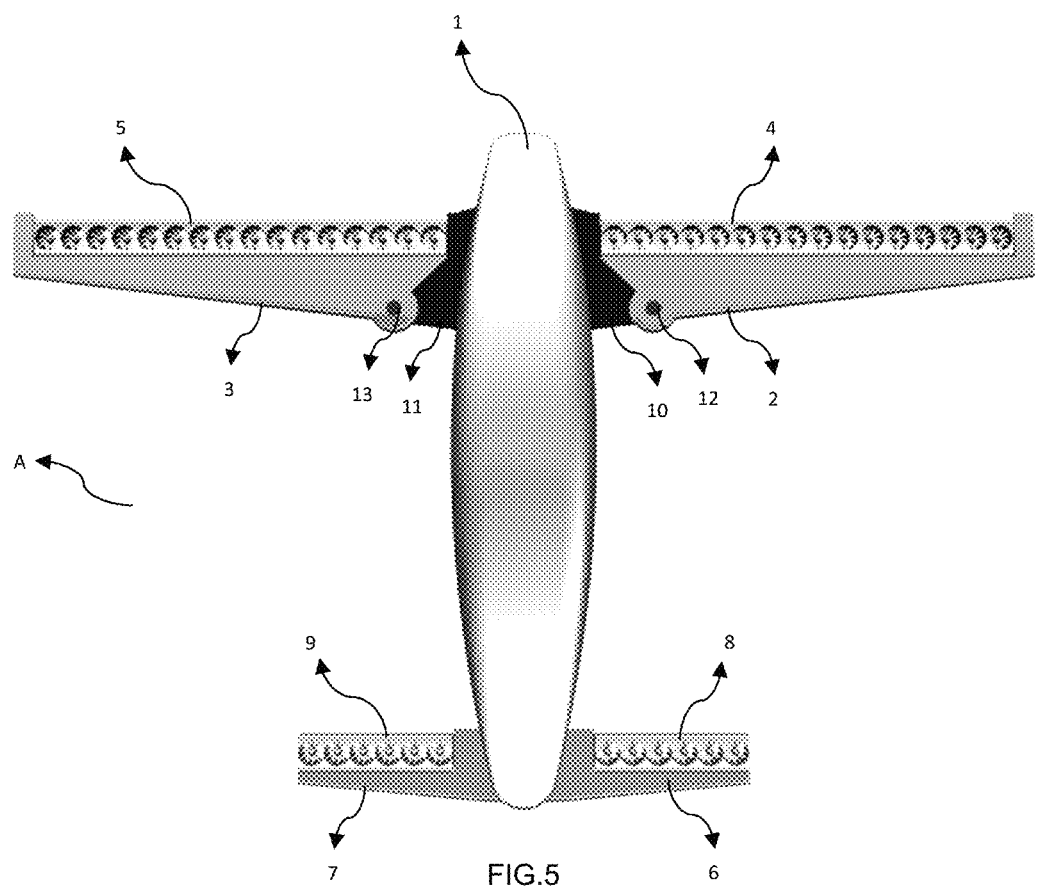
FIG. 5, shows a top view of the embodiment A of the aircraft in "Extended wings hover mode" with extended wings and upward directed engines for hover before and after "cruise mode".

FIG. 2 illustrates a perspective view of embodiment A after "Wing extending Transition phase" and in "Extended wings hover mode" with the wings fully extended and upward directed engines. FIG. 5 shows a top view of the same mode. The aircraft may be controlled as a multi-rotor aircraft in this mode. Vectored forces caused by tilting TEMCS assemblies are also effective in longitudinal direction. Yaw may be induced by mismatching the aerodynamic torque of the engines. Alternatively, yaw moment may be created by vectored forces resulted by at least one tilting engine group or preferably two opposite engine groups. The aircraft may start forward movement by maintaining a positive pitch angle and tilting the TEMCS mounted engines forward. As an alternative solution, the whole aircraft may tilt forward and move forward similar to a conventional multi-rotor aircraft. This solution may be used for short distance hover movements; however it is not the preferred solution since it needs a negative pitch angle which is not favorable for transition to "cruise mode". In order to make transition to "cruise mode", the aircraft starts moving forward by tilting the TEMCS mounted engines forward while the flight computer maintains the most favorable angle of attack by controlling the lift of individual engines. As the speed increases, aerodynamic lift of the wings increases and the control system may continue to tilt the engines forward which results in more forward thrust and less lift created by the engines. When the aircraft forward speed reaches to a point where lift created by the wings is sufficient to compensate the weight of the aircraft the engines may continue to be fully tilted forward.

Figure 3:
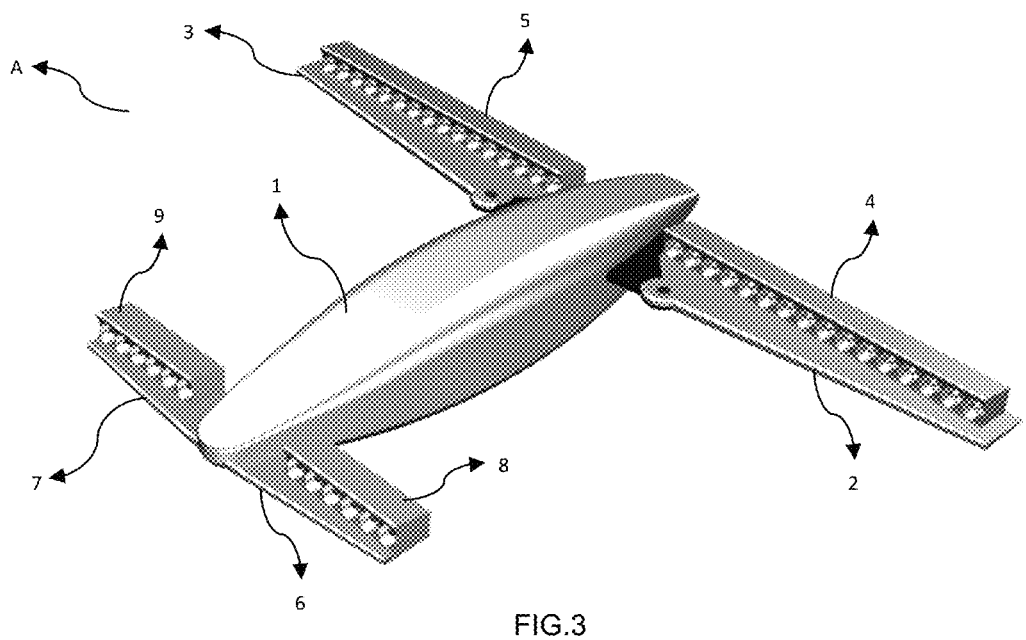
FIG. 3, shows a perspective view of embodiment A of the aircraft in "cruise mode" with extended wings and forward directed engines.
Figure 6:
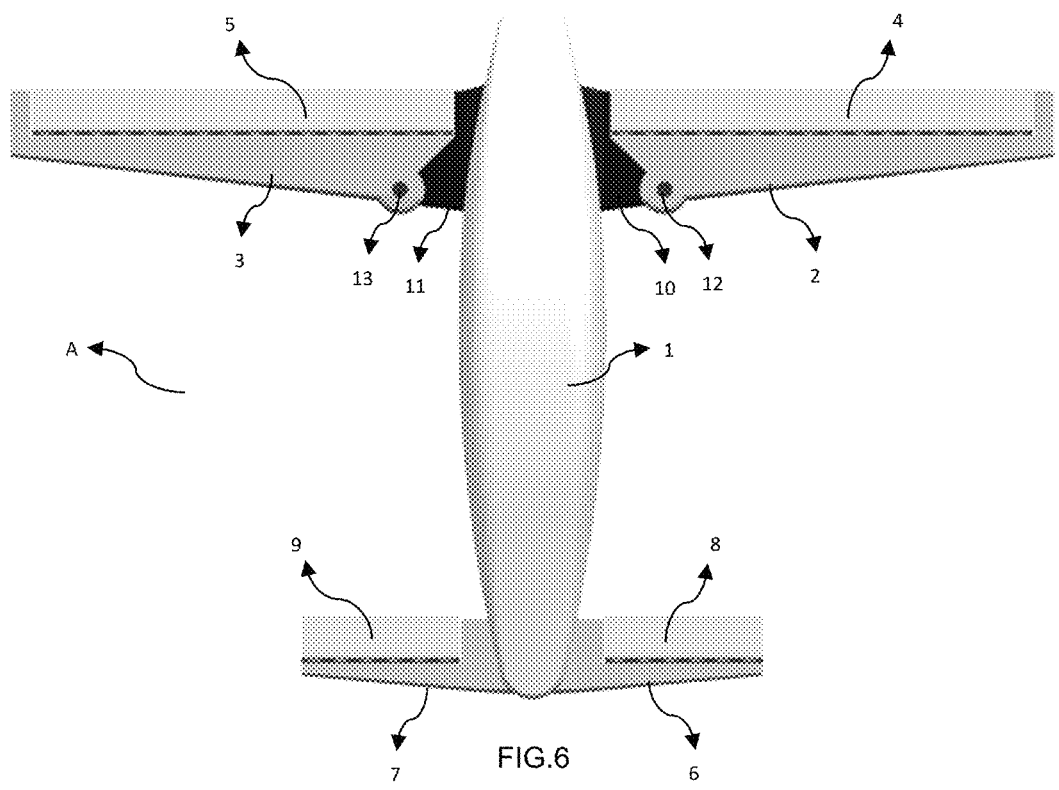
FIG. 6, shows a top view of the embodiment A of the aircraft in "cruise mode" with extended wings and forward directed engines.

FIG. 3 and FIG. 6 respectively show a perspective view and a top view of the embodiment A in "cruise mode" when the wings are fully extended and the TEMCS mounted engines are fully tilted forward in flight direction.

Figure 7:
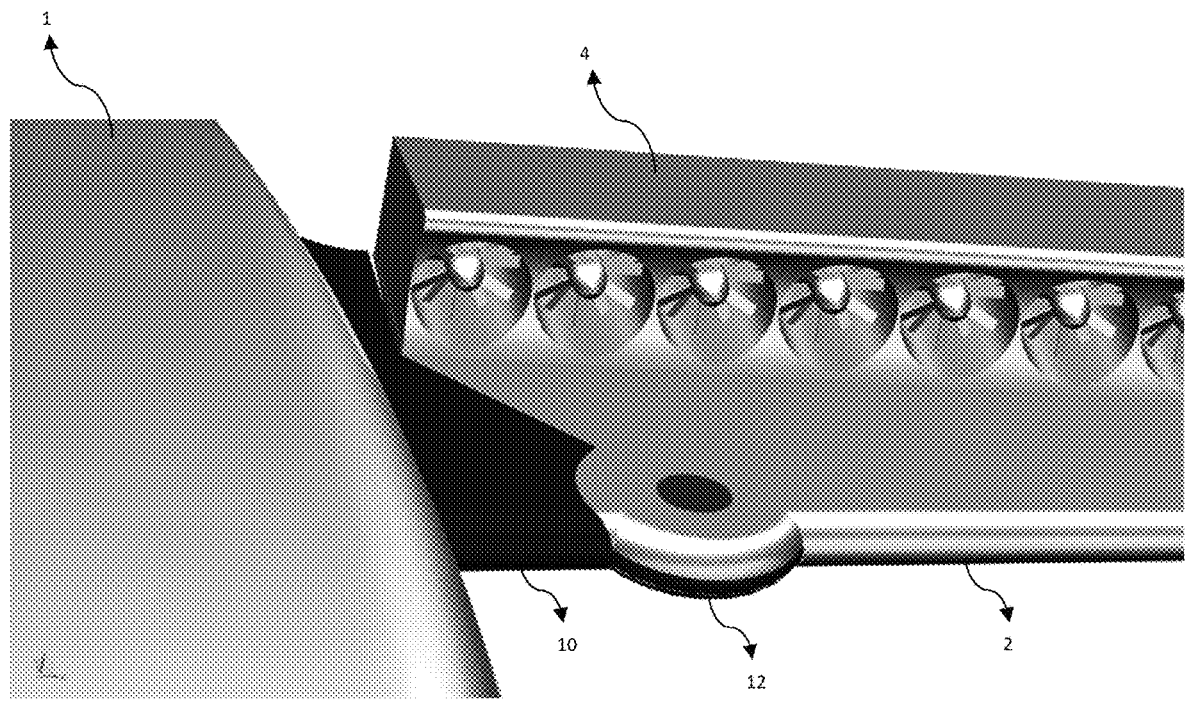
FIG. 7, is a close-up view of a revolute joint of a retractable wing in "cruise Mode" with the retracted wings and forward directed engines.
Figure 8:
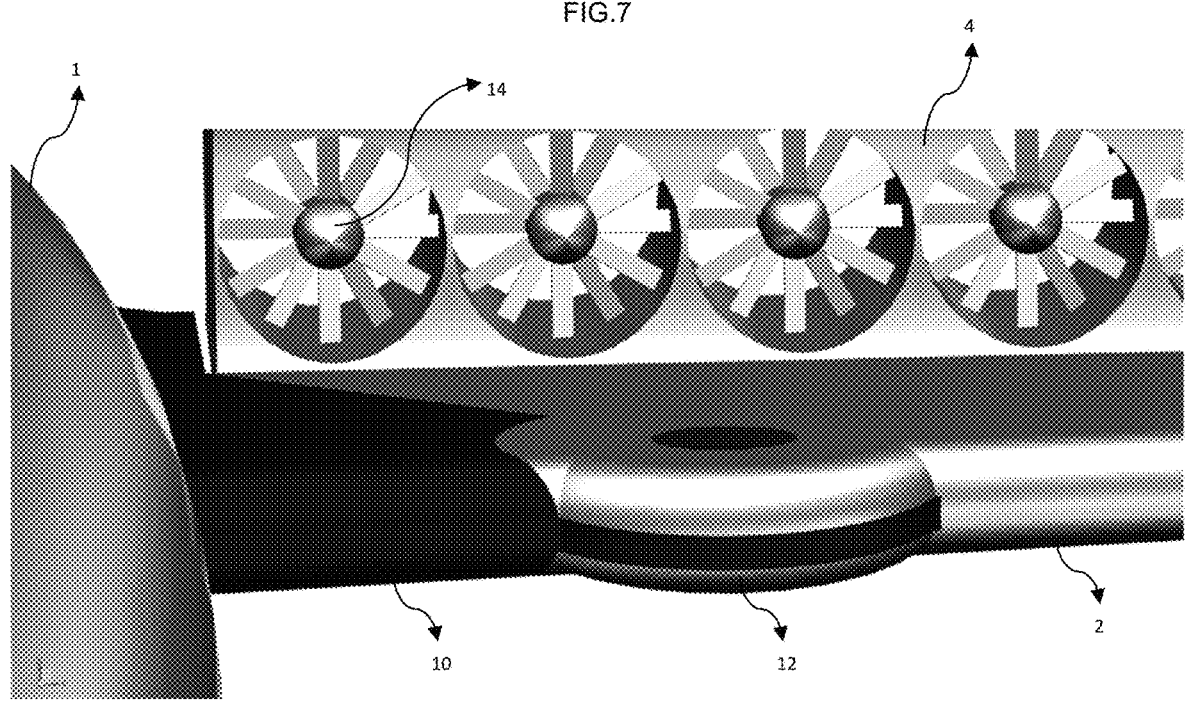
FIG. 8, is a close-up view of a revolute joint of a retractable wing in "cruise mode" with retracted wings and forward directed engines.
Figure 9:
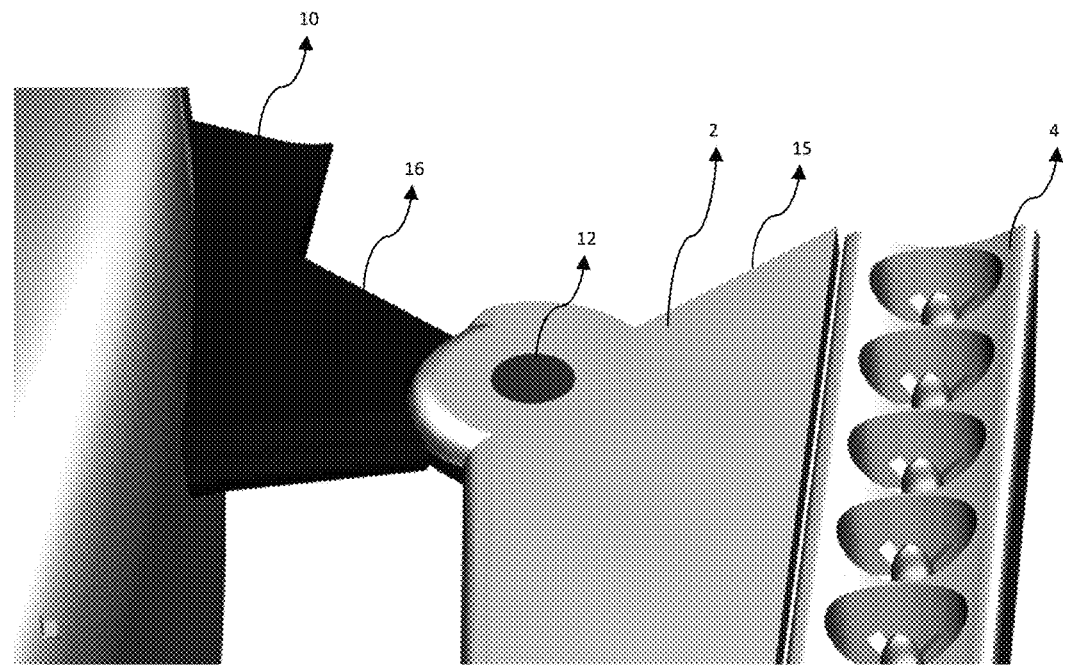
FIG. 9, is a close-up view of a revolute joint of a retractable wing in "Take-off and landing hover mode".

FIG. 7 and FIG. 8 portray an exemplary revolute joint with high bearing surfaces in order to bear the moment applied by the wing during takeoff and landing. Said figures show the wing in extended position. The revolute joint is seamlessly integrated into the aerodynamics of the wing body and support structure in order to avoid creation of excess drag. FIG. 9 shows the same part with retracted wing.

Rotational movement of the wing may be done by a simple revolute joint as shown in the figures, or other mechanical joints and solutions such as a 4 bar linkage, a round rail, etc. A rising hinge solution may be used to guarantee a more stable locking position when the wings are extended.

Figure 10:
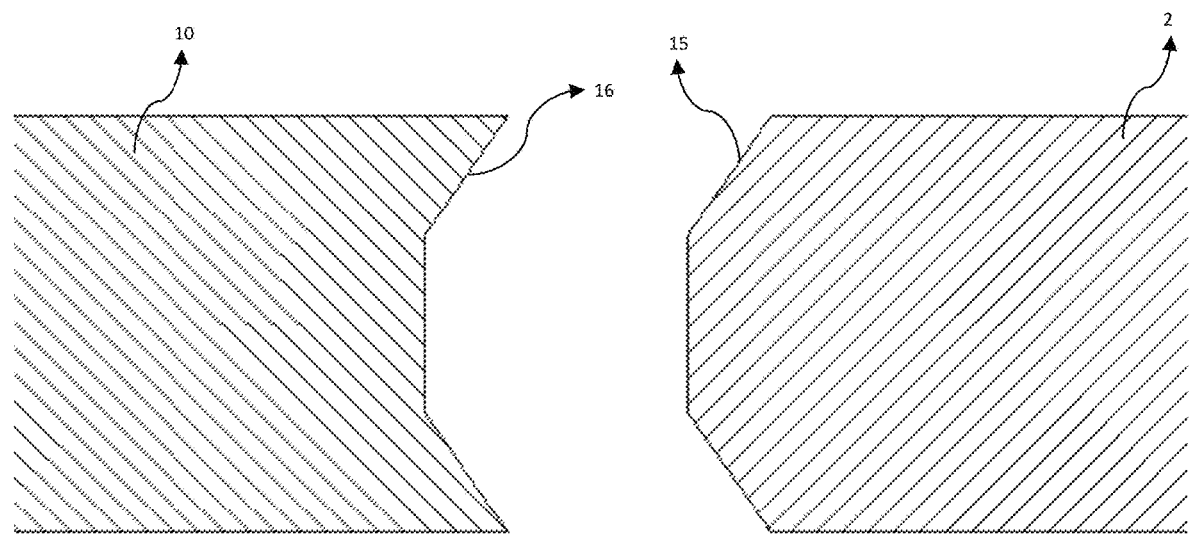
FIG. 10, is a section view of a suggested dented matching surface for the contact surface of the hinged wing and facing support structure.

FIG. 10, shows a suggested matching dented shape for the contact surfaces 15 and 16 of a wing 2 and a support structure 10. A matching dented shape of the contact surfaces 15 and 16 creates additional support to the hinge when the wings are extended to help create better integrity in order to overcome vibration forces during a high speed flight. A similar approach may be used to have matching dented contact surfaces at the other end-stroke to support the wings when the wings are retracted. Such matching contact surfaces can be built between a wing and its hinge support structure or the fuselage. A mechanical brake is suggested to mechanically lock a wing or its actuator when the wings are at end-strokes.

Figure 11:
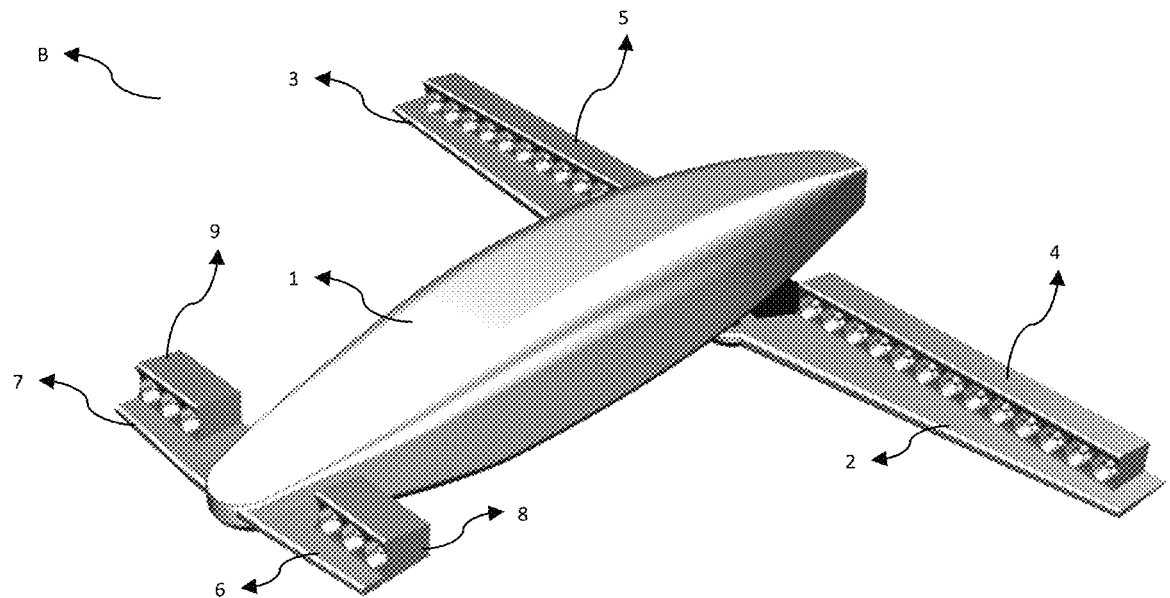
FIG. 11, shows a perspective view of embodiment B of the aircraft in "cruise mode" with extended wings and forward directed engines.

FIG. 11, displays a perspective view of embodiment B of the present invention in "cruise mode". The axes of the hinges are moved underneath the fuselage to provide smaller footprint when the wings are retracted. In case of the displayed one passenger aircraft, the width of the aircraft with retracted wings is less than 7 ft which means the aircraft can be fitted in a standard 9 ft parking. The retracted wing and TEMCS mounted duct fans can be used as stairway for the pilot in order to climb to the cockpit.

Figure 12:
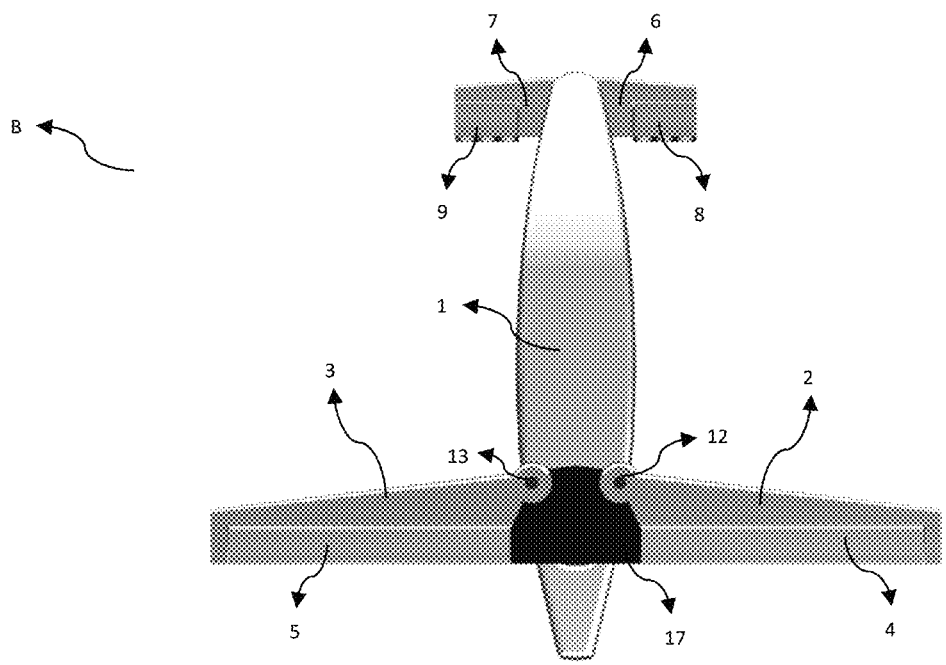
FIG. 12, is a bottom view of embodiment B of the aircraft in "cruise mode" with extended wings and forward directed engines.

FIG. 12, displays a bottom view of embodiment B in "cruise mode". The axes of the hinges 12 and 13 can be seen from this view. It is possible to have the pivot joints closer to each other or even having a single pivot joint in the middle for both wings. The left and the right hinge support structures may be connected together underneath the aircraft to form an integrated structure 17 in order to create better integrity and structural strength. Alternatively, the same wing configuration may be connected to the top of the fuselage.

Figure 13:
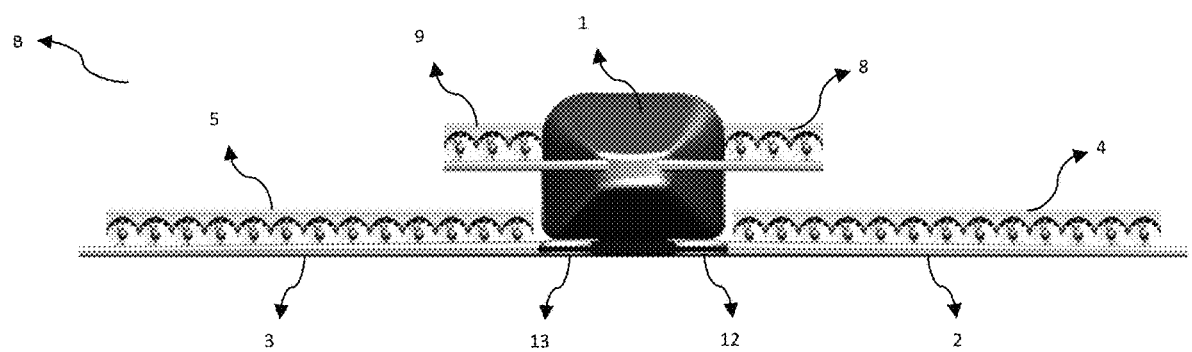
FIG. 13, is a front view of embodiment B of the aircraft in "cruise mode" with extended wings and forward directed engines.

FIG. 13, displays a front view of embodiment B in cruise mode. The front wings 6 and 7 are positioned at a different height comparing with retractable wings 2 and 3 in order to avoid aerodynamic interference.

Figure 14:
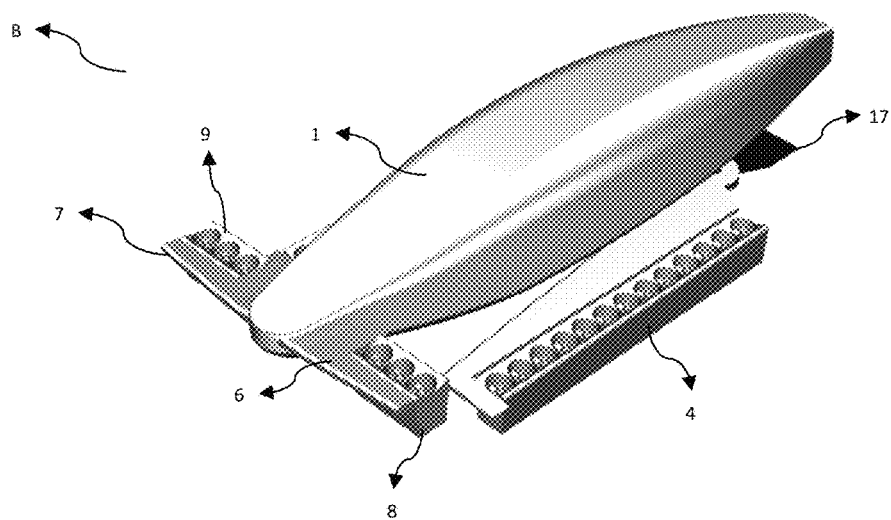
FIG. 14, shows a perspective view of embodiment B of the aircraft in "Take-off and landing hover mode" with retracted wings and upward directed engines for take-off and landing, from and in small landing spots.
Figure 15:
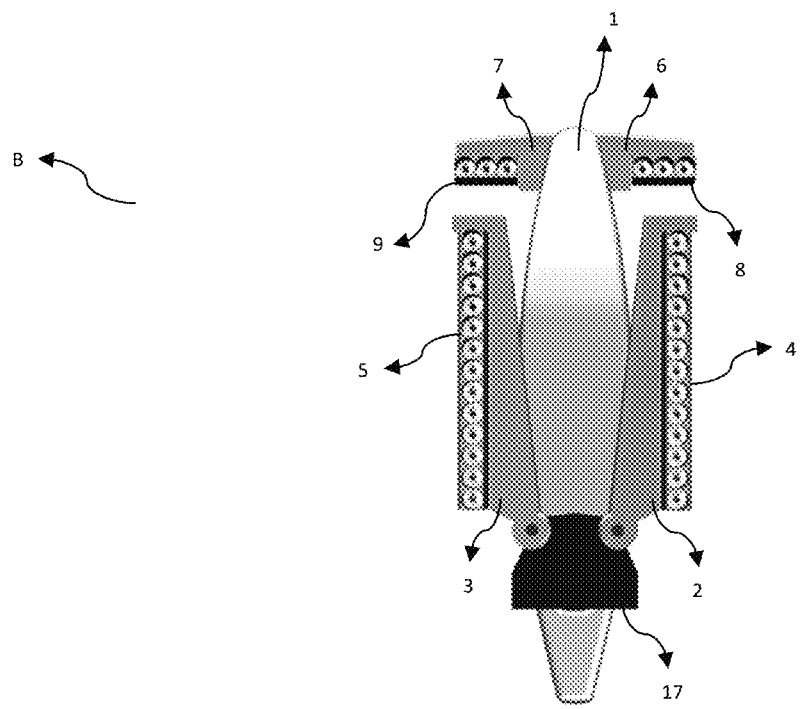
FIG. 15, shows a bottom view of embodiment B of the aircraft in "Take-off and landing hover mode" with retracted wings and upward directed engines for take-off and landing, from and in small landing spots.
Figure 16:
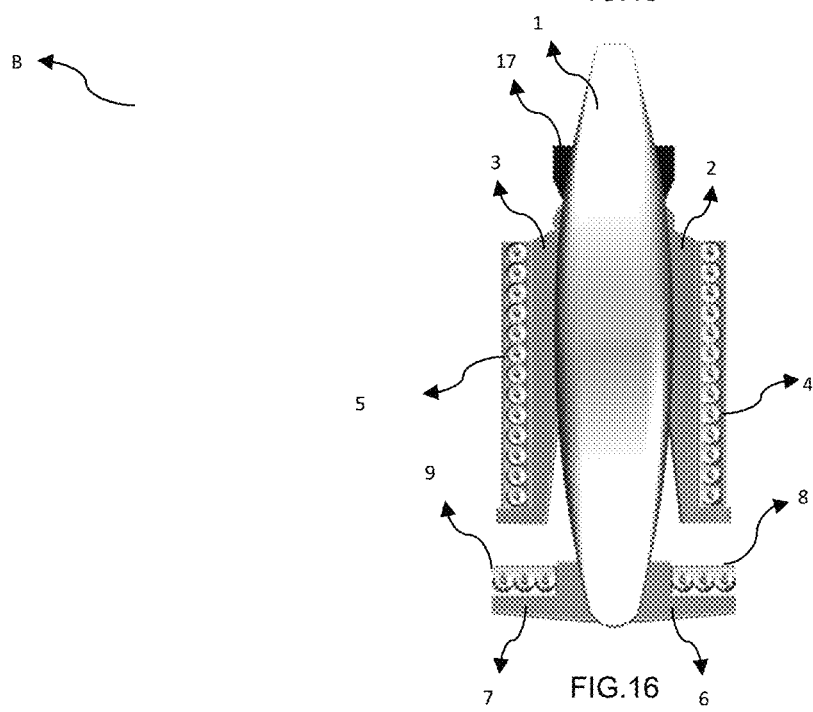
FIG. 16, shows a top view of embodiment B of the aircraft in "Take-off and landing hover mode" with retracted wings and upward directed engines for take-off and landing, from and in small landing spots.

FIG. 14, displays a perspective view of embodiment B in "takeoff and landing hover mode" with retracted wings 2, 3 and upward oriented TEMCS assemblies 4, 5, 8 and 9. FIG. 15 is a bottom view, and FIG. 16 is a top view of the same flight mode of embodiment B.

As a flight strategy the aircraft may start with retracted wings 2, 3. By tilting the trailing end of TEMCS assemblies 4, 5, 8, 9 downward, consequently the engines 14 will be tilted upward and can be create vertical lift when adjusted in a virtually vertical position. The aircraft starts as a multi-rotor aircraft with the additional means of vectored forces of the engines. The flight computer and control system control the lift created by each individual engine 14. Yaw in each direction may be induced by mismatching the aerodynamic torque of the engines. As the second means of creating yaw, by tilting the front group of engines 8, 9 in opposite directions, a yaw moment may be created. A similar approach is possible by means of TEMCS assemblies 4, 5, when the wings are extended. Similar to traditional multi-rotors, rolling the aircraft in each direction, may provide thrust in that direction. As the second means of direction control, by controlling the angle of each TEMCS assembly, controllable vectored forces may be created. In retracted wing position, the retractable wing engine groups of the TEMCS assemblies 4, 5 may produce transversal vectored control forces, while the front engines 8, 9 may produce longitudinal control forces. Thus the vectored forces can control the aircraft both in longitudinal and transversal directions which means the aircraft is highly controllable in "takeoff and landing hover mode". As the aircraft reaches a safe distance from the ground, the retractable wings may be extended by the means of at least one actuator. During the transition, the flight computer continues to control the aircraft similar to a multi-rotor aircraft and also by additional means of vectored forces of the TEMCS supported engines. As the wings extend, the center of gravity of the aircraft is shifted rearward. However, the retractable wings mounted engines are also shifted toward the rear of the aircraft. During this transition, the front groups of engines 8, 9 may be required to create more lift. As the retractable wings 2, 3 become fully extended; the flight computer continues to control the aircraft as a multi-rotor aircraft and by the means of controlling the thrust/lift of the engines and the orientation of the TEMCS assemblies 4, 5, 8, 9. The aircraft is ready to cruise when the wings are fully extended. In order to start to cruise, the TEMCSs trailing ends are tilted upward meaning the engines are tilted forward in order to create forward thrust. As the aircraft starts going forward the wings start to create lift. As the speed increases, the lift created by the wings also increases while the engines are tilted forward, creating more thrust and less lift. When the lift created by the wings is enough to compensate the weight of the aircraft, the engines can be tilted fully forward and the aircraft enters "Cruise Mode".

In order to land, the speed may be reduced to a point above the stall speed. Then the groups of TEMCS mounted engines start being tilted upward by tilting down the trailing end of the TEMCSs. It increases the curvature of the wings and increases the drag and the lift created both by the wings and engines and decreases the thrust created by the engines which together with increased drag helps to further decrease the speed. This process will be continued until the weight is almost carried completely by the lift created by the engines and the aircraft reaches to hover state, re-entering the "extended wing hover mode". Reverse wing transition is performed to retract the wings and with retracted wings, the aircraft enters "Take-off and landing Hover Mode" during which, by controlling the speed of the engines, the roll/pitch angle of the aircraft, and direction of controlled vector forces created by tilt-able engines in both longitudinal and transversal directions, the aircraft can be landed safely.

This is a suggested flight strategy to describe the disclosure capabilities. There may be variations. For example the aircraft may start moving forward even before the wings are fully extended. It may also extend the wings earlier during takeoff if there is enough space. However, extending the wings reduces the controllability of the aircraft during takeoff and landing.

Figure 17:
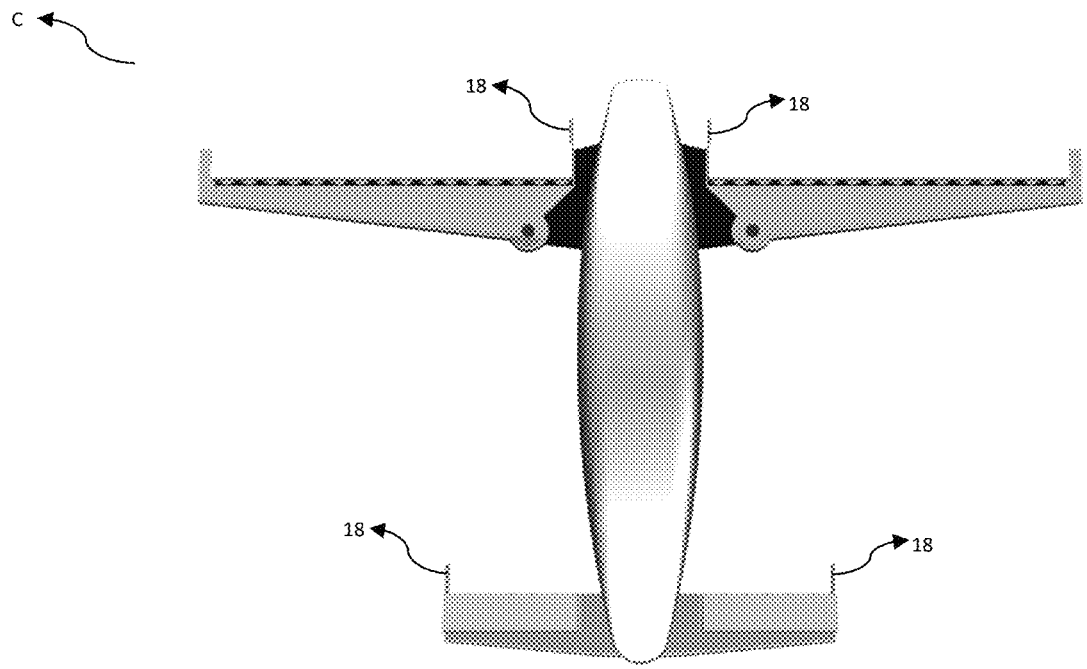
FIG. 17, displays a top view of embodiment C of the aircraft in "Cruise Mode" with extended wings and forward directed engines.
Figure 18:
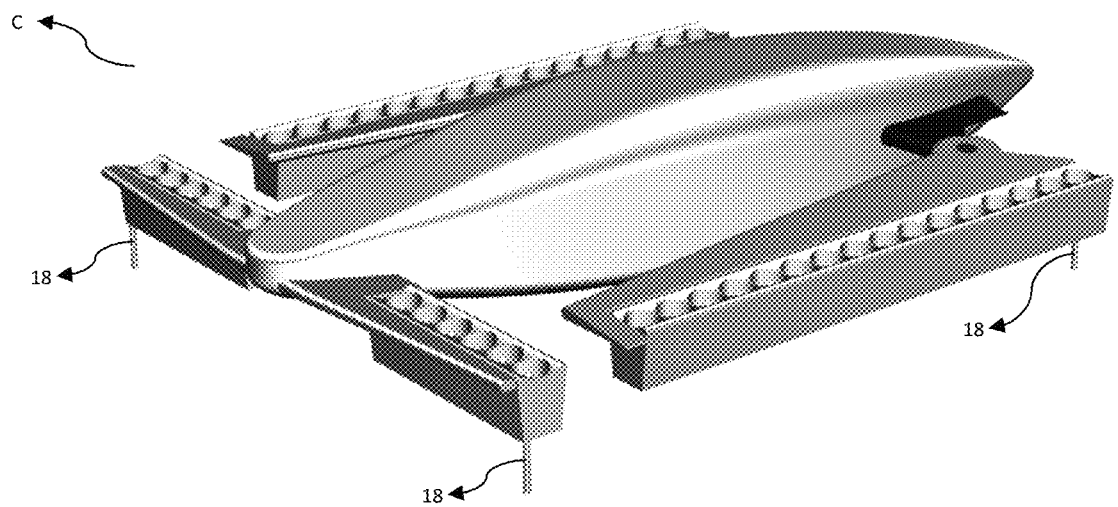
FIG. 18, shows a perspective view of embodiment C of the aircraft in "Take-off and landing hover mode" with retracted wings and upward directed engines and downward directed alighting elements.

FIG. 17, displays a top view of embodiment C of the aircraft with extended wings while FIG. 18, shows a perspective view of the same embodiment with retracted wings. Embodiment C shows the possibility of having landing gear/alighting elements 18 on tilt-able engines/TEMCSs. The alighting element axis is vertical during vertical landing and take-off as it revolves together with the tilt-able engines. The alighting elements axes become parallel with flight direction during cruise and do not cause a lot of drag if it remains always extended. However, it may be telescopically retractable and being retracted during the cruise mode, or may be always out as shown in the images, and being spring loaded to absorb landing shocks and allow smoother landing. Use of this kind of alighting elements limits the possibility of using vectored control forces in proximity of the ground, since this type of control forces requires movements of the TEMCS those consequently move the alighting elements.

Figure 19:
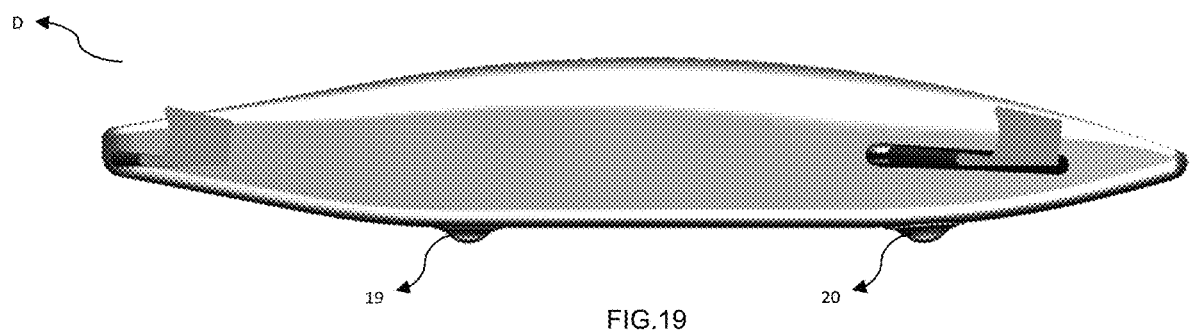
FIG. 19, displays a side view of embodiment D of the aircraft in "cruise mode" with retracted wings and forward directed engines.
Figure 20:
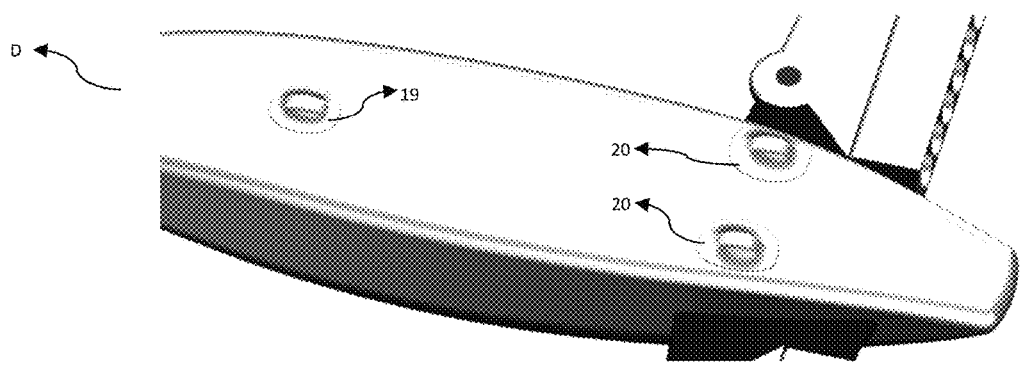
FIG. 20, shows the undercarriage of embodiment D of the aircraft with emergency breakable covers for wheels.
Figure 21:
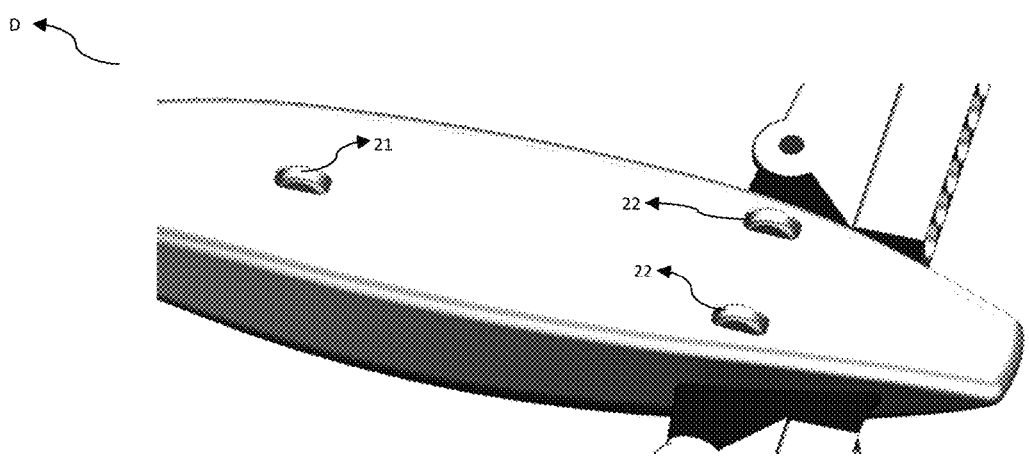
FIG. 21, shows the undercarriage of embodiment D of the aircraft with emergency breakable covers of wheels removed.

FIG. 19, to FIG. 21 display embodiment D of the aircraft. Embodiment D shows a suggested landing gear solution. The displayed embodiment has one front wheel 21 which is covered by a protruded aerodynamic cover 19, and two rear wheels 22 covered by two rear protruded aerodynamic wheel covers 20. Three protruded covers can carry vertical loads and may be used as fixed landing gears during vertical landing and take-off. However, said covers may be designed to be breakable or detachable under horizontal external loads. Thus in the case of emergency landing during cruise mode, the covers break as soon as touching the ground and leave the wheels free to revolve on the ground. FIG. 20, shows the undercarriage of embodiment D of the aircraft with emergency breakable covers for wheels. FIG. 21, shows the undercarriage of embodiment D of the aircraft with emergency breakable covers of wheels removed. The protrusion shape of the covers may be further extended to the fuselage aerodynamic design before and after the wheel to further reduce drag.

The engine of the disclosure may be one of electric fan, jet engine, hydraulic motor, internal combustion engine, etc.

While the presented embodiments do not include a tail, the disclosure may also be equipped with a tail assembly, or a tail component for example a fin, a stabilizer, etc.

While the presented embodiments all show forward retracting wing configurations, a reverse configuration may be used with rearward retracting wings connected closer to the front of the aircraft. Said aircraft may have one or a pair of stabilizers in the rear, supporting two elevators those each support at least one engine.

The invention claimed is:

1. A vertical take-off and landing aircraft including:
    a fuselage;
    a flight computer;
    a control system;
    at least one pair of retractable wings being retractable and extendable sideways with axes of rotation of the retractable wings being substantially vertical;
    an absolute angle between said axes or rotation and a yaw axis of the aircraft being limited to 5 degrees;
    the retraction and extension of the retractable wings performed while the aircraft is hovering;
    at least one actuator to extend and retract the retractable wings, with said retractable wings being supported by at least one hinge and said hinge being supported by the fuselage;
    the at least one pair of wings having at least one trailing edge mounted control surface (TEMCS); and
    at least one engine being supported by said TEMCS;
    wherein said engine being tilt-able together with said TEMCS thus creating vectored forces;
    said TEMCS having rotational range of motion of at least 80 degrees in order to tilt the said at least one engine fully upward to a substantially vertical position in order to create vertical lift for a hover mode and tilt the said at least one engine forward to a substantially horizontal position in order to create thrust for a cruise mode and having bidirectional range of motion of at least 1 degree in both substantially horizontal and substantially vertical positions in order to create controlled vectored forces in both positions.

2. The aircraft according to claim 1, wherein the type of actuator is one of a hydraulic actuator, a screw actuator, a ball screw actuator or a rotary actuator.

3. The aircraft according to claim 1, wherein the retractable wings are one of rearward retracting or forward retracting wings.

4. The aircraft according to claim 1, wherein the engine is one of an electrically driven propeller, an electrically driven ducted fan, a motor driven ducted fan, a jet engine, a hydraulic motor driven propeller, a hydraulic motor driven ducted fan, or an internal combustion engine driven propeller.

5. The aircraft according to claim 1, further comprising an onboard power generator.

6. The aircraft according to claim 1, wherein at least one of said retractable wing hinges type is one of a pivot joint, a multi-linkage mechanism, a round rail, or a rising butt hinge.

7. The aircraft according to claim 1, wherein there is at least one mechanical link between a right retractable wing and a left retractable wing to guarantee synchronized extension and retraction of the wings.

8. The aircraft according to claim 1, wherein the fuselage has a lifting body design.

9. The aircraft according to claim 1, wherein at least one of the retractable wings and upward tilted engines may be used as a stairway for the pilot to reach the cockpit.

10. The aircraft according to claim 1, wherein a plurality of engines is supported by at least one TEMCS.

11. The aircraft according to claim 1, wherein the hinge of at least one of said retractable wings is located one of below, above or at one side of the center line of the fuselage.

12. The aircraft according to claim 1, further comprising at least one mechanical brake to lock at least one wing movement in at least one working position.

13. The aircraft according to claim 1, further comprising:
    at least one landing gear being supported by said TEMCS, and situated toward the trailing side of at least one of said tilt-able TEMCS.

14. An emergency landing means for a VTOL aircraft according to claim 1, including at least one wheel covered by an aerodynamic breakable cover which is broken upon touching ground in case of emergency landing during cruise mode allowing the covered wheel to revolve on ground.

15. The emergency landing means of a VTOL according to claim 14, wherein the said breakable cover is designed to bear vertical loads thus being usable as landing gear for Vertical take-off and landing.

16. The aircraft according to claim 1, further comprising:
    at least one pair of non-retractable wings having at least one TEMCS; and
    at least one engine being supported by said TEMCS.

17. The aircraft according to claim 16, wherein the retractable wings and non-retractable wings are disposed on the fuselage at different heights in order to avoid aerodynamic interference during cruise mode.

* * * * *